Aug 5, 1941.    G. A. TINNERMAN    2,251,643
FASTENING DEVICE
Original Filed Jan. 7, 1937

INVENTOR.
GEORGE A. TINNERMAN
BY Bates, Teare, & McBean
ATTORNEYS

Patented Aug. 5, 1941

2,251,643

UNITED STATES PATENT OFFICE 2,251,643

FASTENING DEVICE

George A. Tinnerman, Cleveland, Ohio, assignor to Tinnerman Products, Inc., Cleveland, Ohio, a corporation of Ohio Original application January 7, 1937, Serial No. 119,415, now Patent No. 2,222,449, dated November 19, 1940. Divided and this application May 6, 1940, Serial No. 333,579

3 Claims. (Cl. 85—36)

This invention relates to fastening devices designed to be used with a bolt or a screw fastening for connecting two parts together, and relates more particularly to such fastening devices as are adapted for use in those locations where only one side of a part to be joined is accessible for making a connection. The present application is a division of my co-pending application, Serial No. 119,415, filed January 7, 1937, now Patent No. 2,222,449, dated November 19, 1940.

One of the uses to which the present form of fastening device may be applied is in the assembly of an automobile body where the fender is attached and where provision must therefore be made to prevent the entrance of water from the exterior of the car through the bolt opening, or through any opening which is utilized for locating the fastener in bolt receiving position. Similar conditions exist in the assembly of a refrigerator cabinet where it is essential that the insulation carrying compartment be sealed against the entrance of moisture and also in railway cars, airplanes, steel tanks, furnaces and associated types of products.

An object of the present invention is to make a fastener which may be inserted in a bolt receiving aperture from one side of the part to be joined and which will remain automatically in bolt receiving position. Additionally, the invention contemplates a construction which will seal the opening against the walls of which the fastener is positioned by a snap-fastening action.

Figure 1:
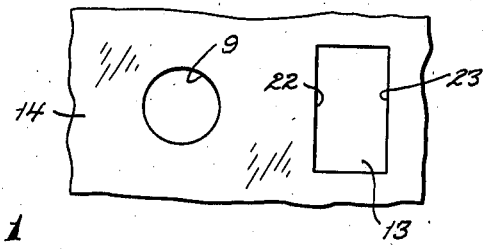
Figure 2:
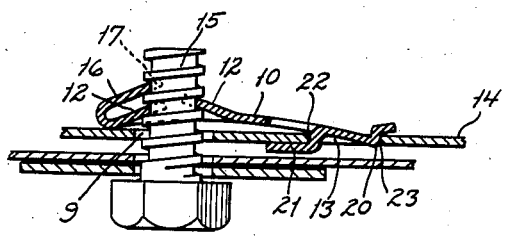
Figure 3:
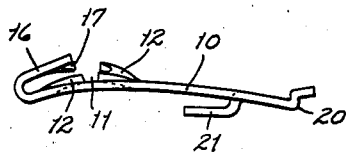
Figure 4:
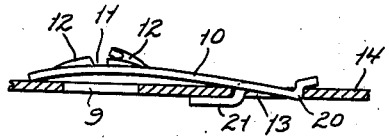
Figure 5:
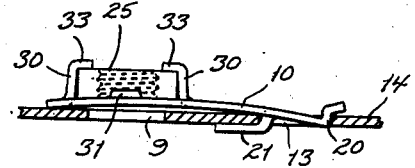

The invention is shown in various forms in the drawing, wherein Fig. 1 is a top plan view of an article which is adapted to receive the fastener; Fig. 2 is a vertical section taken through a plurality of parts that are joined together by means of a fastener embodying the present invention; Fig. 3 is a side view of the fastener shown in Fig. 2; Fig. 4 is a section through a part to be joined having a modified form of thread engaging construction, and Fig. 5 is a section through a part to be joined having a fastener thereon embodying a further modified form of construction.

The fastener which is illustrated in Figs. 2 and 3 has a sheet metal body portion 10 which has an aperture 11 therein and which carries a thread engaging portion 12 and is provided with means for attaching it to an opening 13 in a support 14. In the form shown in Figs. 2 and 3, the thread engaging portion for receiving a member, such as a bolt 15, includes an arm 16 which extends upwardly and backwardly upon itself and which cooperates with the thread engaging portion 12 to engage a multiple turn on the shank of the threaded member 15. To facilitate this, the arm 16 is shown as terminating in a notch 17, the walls of which are shaped on a helix to conform to that of the thread on the member 15.

The means for attaching the fastener to a support comprises cooperating attaching elements 20 and 21, which extend downwardly at spaced points from the thread-engaging body portion. The attaching element 21 is shown in the form of a tongue which is struck downwardly from the body portion and which cooperates with the body to form a crotch into which the part 14 may extend. The downwardly extending portion of the tongue thus defines a shoulder which is adapted to bear against a wall 22 of the opening 13. The attaching element 20 likewise defines a shoulder which is adapted to engage the opposite wall 23 of the opening 13, and to cooperate with the part 21 to lock the fastener in fastening position.

To attach the fastener to a support, the leading end of the tongue 21 is pressed downwardly through the opening 13 until it engages the support 14 on the side opposite the fastener and then the fastener is slid along the support until the shouldered portion 20 clears the wall 23 of the opening 13. The distance between the shoulders on the parts 20 and 21 is so related to the distance between the walls 22 and 23 of the opening 13 that the fastener is locked into place by a snap-fastening action. By utilizing a fastener body of sufficient width to cover the opening 13, the opening is thereby sealed whenever the fastener is locked in bolt-receiving position. Moreover, by extending the tongue in generally parallel spaced relationship to the body portion, the fastener may be adequately locked with sufficient rigidity to permit turning of the threaded member into the fastener by means of a power operated tool without binding against the walls of the opening 9 and without dislodging the fastener from its locked position on the article.

In Figs. 4 and 5, I have shown modified forms of thread engaging construction, the construction in Fig. 4 having provision for engaging only one turn of a bolt thread. In Fig. 5, however, provision is made for multiple thread engagement, by means of a standard nut 25. In this form, a square nut is shown and is held in position by lugs 30 which extend upwardly from the body of the fastener on two of its opposite sides, while lugs 31 extend upwardly from the body of the fastener and engage the nut on the two remaining sides. In the preferred arrangement, the lugs 30 are longer than the depth of the nut, whereby the projecting ends thereof are adapted to be bent inwardly to form flanges 33 which engage the top of the nut. The lugs 30 and 31 may be formed by deforming the metal which comprises the body of the fastener.

An advantage of the fastener which is made in accordance with the present invention is the fact that it is self-sustaining in bolt or article receiving position and that it may be easily manufactured by relatively simple tools. A further advantage is the fact that when the fastener is used in those locations where the assembly opening must be sealed, the closure or sealing is effected automatically by the application of the fastener to the part to be joined.

I claim:

1. A fastener comprising an apertured sheet metal body having a thread engaging portion and means for attaching the fastener in an opening in a support, said attaching means comprising two cooperating attaching elements both extending downwardly at spaced points from said thread engaging body portion, one of said attaching elements being adapted to extend through said opening in the support and engage said support on the side opposite to that on which said thread engaging body portion is disposed in fastening position, the other attaching element being adapted to cooperate in locking the fastener in such fastening position, and comprising a detent extending entirely across the body and adjacent one of the ends thereof.

2. A fastener comprising an apertured sheet metal body having a thread engaging portion and means for attaching the fastener in an opening in a support, said attaching means comprising two cooperating attaching elements both extending downwardly at spaced points from said thread engaging body portion, said attaching elements defining spaced shoulders having a spacing corresponding substantially to the space between opposite walls of said opening, one of said attaching elements being adapted to extend through said opening in the support and including a substantial tongue extending in generally parallel and spaced relation to the fastener body, said tongue being adapted to engage said support on the side opposite to that on which said thread engaging body portion is disposed in fastening position, and the shoulder defined by the other attaching element being adapted to engage a wall of said opening to cooperate with said tongue in locking the fastener in such fastening position, said last named shoulder extending entirely across the body adjacent one of the ends thereof.

3. A fastener comprising an apertured sheet metal body having a thread engaging portion, and having means for attaching the fastener in an opening in a support, said thread engaging portion including an arm that extends upwardly and backwardly in spaced relation to the body of the fastener so as to provide multiple turn engagement with a threaded member that is passed through the fastener body, said attaching means comprising two cooperating attaching elements both extending downwardly at spaced points from said thread engaging body portion, one of said attaching elements being adapted to extend through said opening in the support and to engage said support on the side opposite to that on which said thread engaging body portion is disposed in fastening position, the other attaching element being adapted to cooperate in locking the fastener in such fastening position, said last named element comprising a detent extending entirely across the body and adjacent one of the ends thereof.

GEORGE A. TINNERMAN.